Dec. 8, 1953   B. F. GOCHENOUR   2,661,920
IMPLEMENT HOLDING DEVICE
Filed Feb. 26, 1951   2 Sheets-Sheet 1
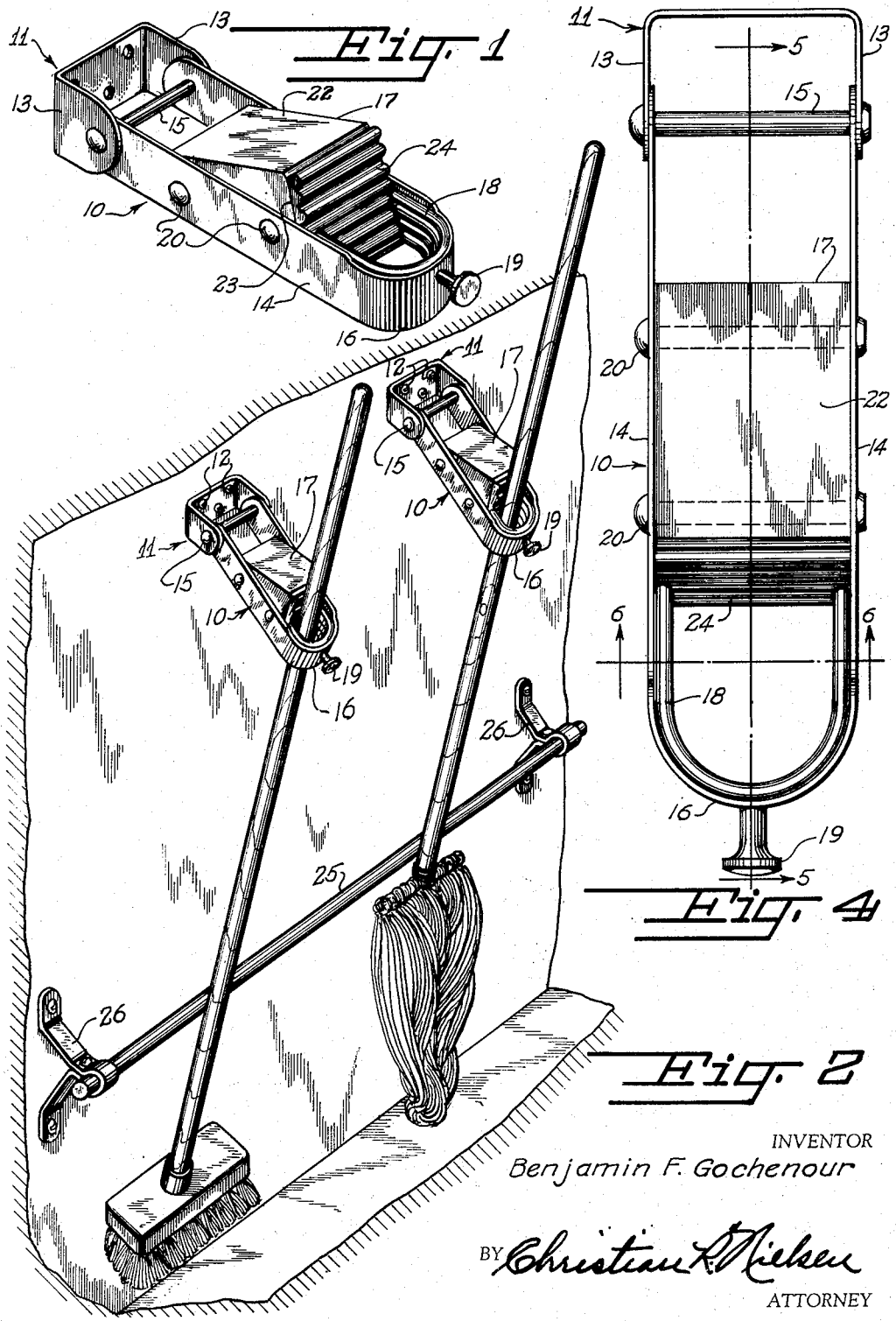
INVENTOR
Benjamin F. Gochenour
BY Christian L. Nielsen
ATTORNEY Dec. 8, 1953  B. F. GOCHENOUR  2,661,920
IMPLEMENT HOLDING DEVICE
Filed Feb. 26, 1951  2 Sheets-Sheet 2
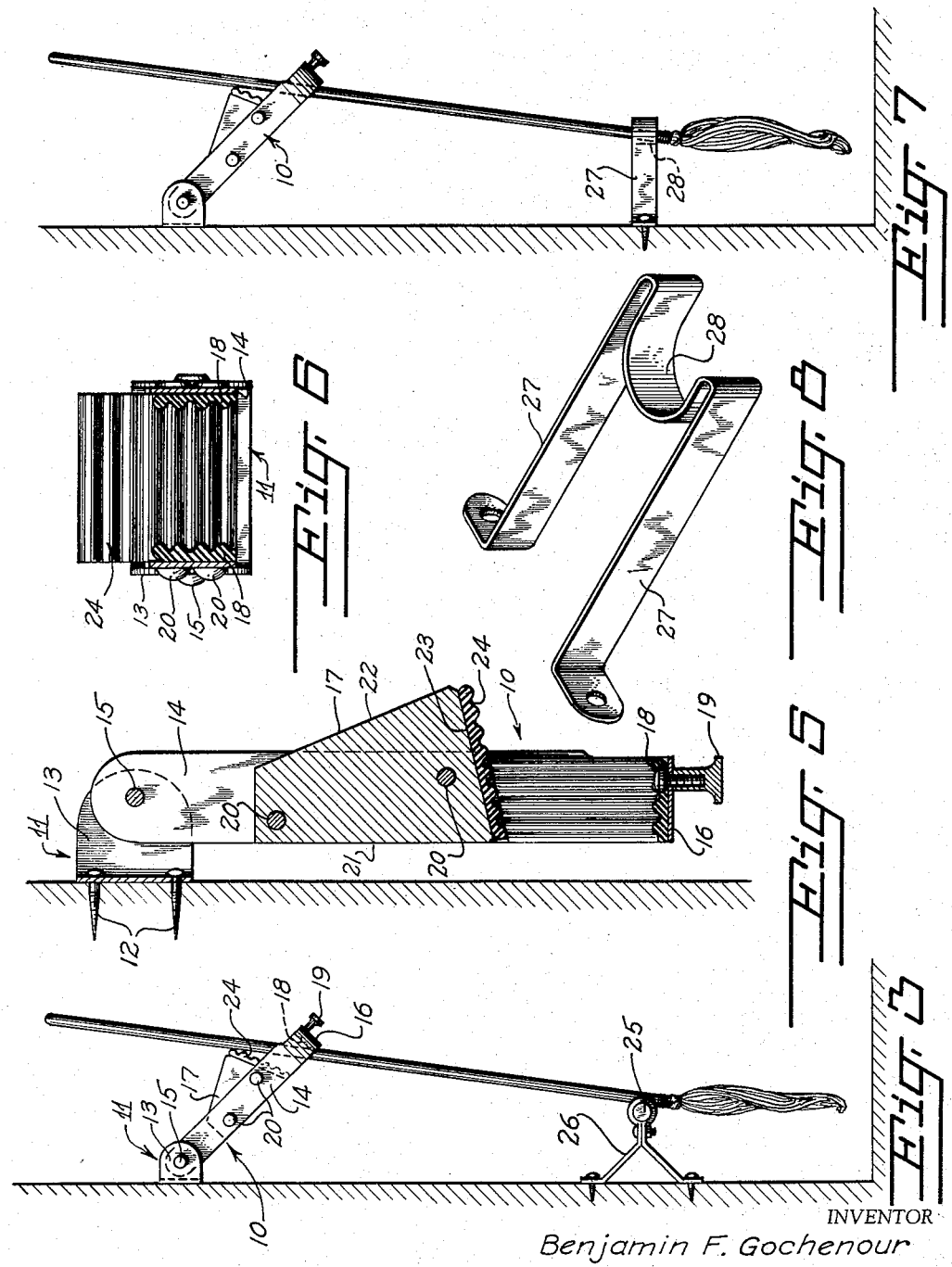
INVENTOR
Benjamin F. Gochenour
BY Christian A. Nielsen
ATTORNEY Patented Dec. 8, 1953

2,661,920

UNITED STATES PATENT OFFICE 2,661,920

IMPLEMENT HOLDING DEVICE

Benjamin F. Gochenour, Woodstock, Va.

Application February 26, 1951, Serial No. 212,820

2 Claims. (Cl. 248—113)

This invention relates to an implement holding device and it consists in the constructions, arrangements and combinations herein described and claimed.

It is the cardinal object of the invention to provide a device for supporting in a suspended relation, implements embodying an operating handle, said device including a gravity vise-lock grip upon the handle for positive retention of the implement in said suspended relation, the gripping means being readily releasable when it is desired to remove said implement.

It is a still further object of the invention to provide an implement holding means embodying a bracket which may be readily secured upon a wall of a building or the like, a U-shaped gripping member being pivotally connected to said bracket for movement into a horizontal position, and including an intermediately positioned gripping block cooperable with the bight portion of the U-shaped member to effect a vise-lock grip upon the handle of an implement when inserted between the block and the bight portion, when said U-shaped member tends to move to normal vertical position with respect to the bracket.

It is a still further object of the invention to provide a novel means in connection with the holding device for maintaining the working head of an implement in spaced relation to a supporting wall, thus preventing soiling of the wall as would be the case should a wet or damp mop be suspended thereagainst.

Additional objects, advantages and features of invention will be apparent from the following description considered in conjunction with the accompanying drawings, wherein, Figure 1 is a perspective view of the implement holding means.

Figure 2 is a perspective view of a pair of implement holding devices arranged upon a wall and illustrating the suspension of a stable broom and a mop.

Figure 3 is a side elevation thereof,

Figure 4 is a top plan view of the holding device,

Figure 5 is a longitudinal section on the line 5—5 of Figure 3.

Figure 6 is a cross section on the line 6—6 of Figure 3.

Figure 7 is a side elevation of the holding means employing a modified form of implement spacing means, and Figure 8 is a perspective view thereof.

Reference is first invited to Figure 1 of the drawings, wherein the reference character 10 represents the implement holding means generally. The holding means comprises a bracket 11 having openings for mounting screws 12 for securing the device upon a wall or the like. The bracket 11 is formed with a pair of spaced apertured ears 13 between which respective legs 14 of a U-shaped member are pivotally mounted by means of a bolt 15. The legs 14 are connected by means of an arcuate bight portion 16 which cooperates with a gripping block 17 for retaining an implement handle, as will be explained hereinafter.

The bight portion 16 is provided with a suitable friction material 18, in the present instance, a combination of rubber and fabric being shown, the rubber having corrugations. The friction material may be secured to the inner face of the bight portion and in addition a handle member 19 has a reduced end secured through openings formed in the bight portion and the friction material, the reduced end being peened or otherwise upset to secure the handle. The friction material 18 is extended inwardly along respective legs 14 a distance, for a purpose as will presently appear.

Substantially medially of the length of the legs 14, the gripping block 17 is mounted by means of screws 20, and as best seen in Figure 5, the bottom face 21 of the block lies flush with the lower edges of the legs, while the top wall 22 projects a distance above the upper edges of the legs and is rearwardly inclined in the direction of the bracket 11. The front face 23 of the block is thus presented at a rearwardly inclined angle with respect to the bight portion and at a height a substantial distance above the upper edge of the bight portion. A corrugated friction material 24 is firmly secured to the front face 23 of the block and of such width as to abut respective side portions of the friction material 18 of the bight portion 16. It will be noted from a consideration of Figures 1, 4, 5 and 6 that the corrugations on the frictional materials 18 and 24 are arranged at right angles to one another, to effectively grip a handle disposed therebetween.

In use, when it is desired to suspend an implement by means of the holding device 10 which is normally disposed in a downward direction, the handle 19 is grasped to elevate the device to a substantially horizontal position to permit passage of a handle between the bight portion 16 and the block 17. The holding device 10 is then released allowing it to swing downwardly by gravity, which will present the friction material 24 of the gripping block against one side of the handle and forcing the opposite side of the handle against the friction material 18 of the bight portion 16. It should be noted that by reason of the inclined relation of the friction material 24 and its location above the bight portion 16, a vise-like gripping action upon the handle will be effected augmented by the weight of the implement. The release of a handle is effected by grasping the knob 19 and elevating the holding device to a substantially horizontal position so as to remove contacting engagement between the friction material of the bight and the gripping block.

It will be obvious that a plurality of holding means may be arranged in group relation, an example being shown in Figure 2, and in order that the working heads of the implements can be held in spaced relation with respect to a wall surface upon which the devices are mounted, a rest or stop bar 25 is supported in brackets 26. The rod or stop bar 25 will be of such length as to accommodate the desired number of holding devices.

In Figures 7 and 8 there is illustrated a modified form of spacing bracket for a single implement handle and in this instance a bracket 27 is shown having a semi-circular seat 28. The bracket 27 is mounted upon the wall in vertical alignment with the holding device 10 so that the handle of the implement will come to rest within the seat and thus support the working head of the implement spaced from the wall.

While I have shown and described a preferred form of the device, this is by way of illustration only, and I consider as my own, all such modifications in construction as fairly fall within the scope of the appended claims.

I claim:

1. An implement holding device, comprising a bracket for attachment to a wall surface, a U-shaped member having a pair of parallel legs pivotally connected to said bracket, said U-shaped member providing a bight portion, a gripping block secured between said legs, said gripping block being positioned inwardly of the bight portion a suitable distance, defining a space for passage of a handle of an instrument, said gripping block having a facing of corrugated frictional material on the side opposite to the bight of the U-shaped member, the corrugations extending transversely with respect to the legs of the U-shaped member, and said bight portion being provided with a corrugated frictional material having extensions along respective legs of the U-shaped member and terminating in contacting engagement with said gripping block, the corrugations of the frictional material on said legs being at right angles to the corrugations on said gripping block.

2. An implement holding device comprising a bracket for attachment to a wall surface, a U-shaped member having a pair of spaced parallel legs pivotally connected to said bracket, said U-shaped member having a bight portion, a gripping block secured between said legs, said gripping block being spaced inwardly of the bight portion defining a space for passage of a handle of an implement, said gripping block having a front face inclined rearwardly in the direction of the pivotal end of said legs, said gripping block being of a height at its front end greater than the height of the bight portion of the U-shaped member, said gripping block being provided with a corrugated frictional material, the grooves of which extend transversely between said legs, and said bight portion being provided with a corrugated frictional material having extensions along respective legs of the U-shaped member and terminating in contacting engagement with the corrugations of the frictional material on said gripping block, the corrugations of the frictional material on said legs being at right angles to the corrugations on said gripping block.

BENJAMIN F. GOCHENOUR.

References Cited in the file of this patent

UNITED STATES PATENTS

| Number | Name | Date |
|---|---|---|
| 449,982 | Townsand | Apr. 7, 1891 |
| 586,238 | King | July 13, 1897 |
| 792,931 | Schade | June 20, 1905 |
| 819,070 | Kenerson | May 1, 1906 |
| 1,109,413 | Gorham | Sept. 1, 1914 |
| 1,206,655 | Beleher | Nov. 28, 1916 |
| 1,262,920 | Chouvaldjy | Apr. 16, 1918 |
| 1,459,582 | Dubee | June 19, 1923 |
| 1,494,777 | Dodsworth | May 20, 1924 |
| 1,736,591 | Gregory | Nov. 19, 1929 |
| 2,221,801 | Keppinger | Nov. 19, 1940 |
| 2,422,891 | Dickson | June 24, 1947 |